United States Patent [19]

Koo

[11] 3,851,186

[45] Nov. 26, 1974

[54] DECODER CIRCUIT

[75] Inventor: James Teh-Zen Koo, Wescosville, Pa.

[73] Assignee: Bell Telephone Laboratories, Incorporated, Murray Hill, N.J.

[22] Filed: Nov. 9, 1973

[21] Appl. No.: 414,220

[52] U.S. Cl. .......... 307/205, 307/223 R, 307/251, 340/347 DD

[51] Int. Cl. .......... H03k 19/08

[58] Field of Search .......... 328/104, 119, 154; 307/203, 205, 223 R, 251, 304; 340/347 DD

[56] References Cited

UNITED STATES PATENTS 3,539,823 11/1970 Zuk .......... 340/347 DD 3,631,465 12/1971 Heeren .......... 307/205 X

*Primary Examiner*—John Zazworsky

*Attorney, Agent, or Firm*—L. C. Canepa

[57] ABSTRACT

A conventional MOS binary-to-one-out-of-N decoder is modified to reduce the number of MOS devices associated with each of the N output lines of the unit. Additionally, the power consumption per output line of the modified decoder is less than that of the conventional unit.

6 Claims, 6 Drawing Figures

FIG. 2
PRIOR ART
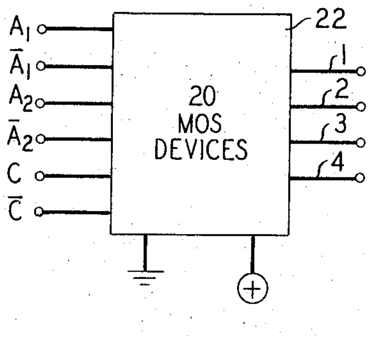
FIG. 4
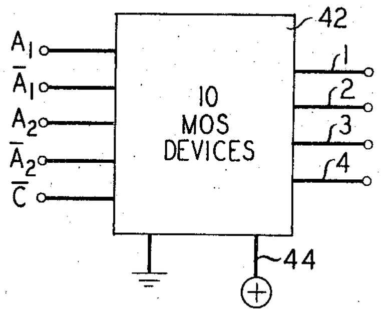
FIG. 3
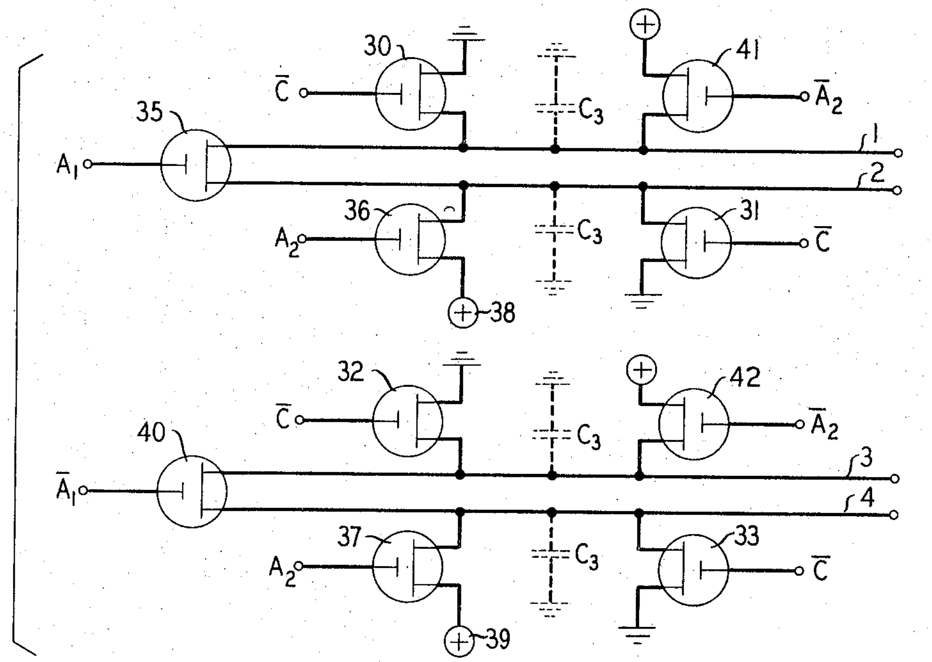
FIG. 5
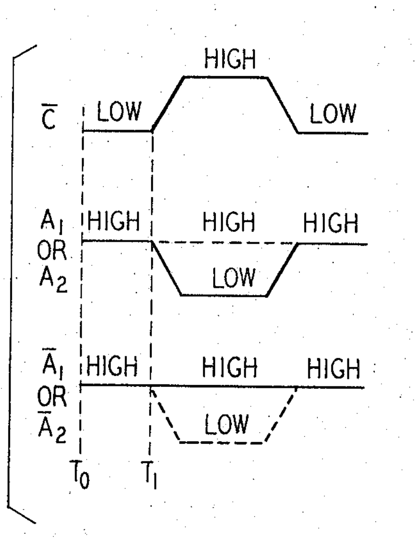
FIG. 6
| | | | | |
|---|---|---|---|---|
| $A_1$ | H | H | L | L |
| $A_2$ | L | H | L | H |
| $\bar{A}_1$ | L | L | H | H |
| $\bar{A}_2$ | H | L | H | L |
| $\bar{C}$ | H | H | H | H |
| SELECTED OUTPUT LINE | 1 | 2 | 3 | 4 |

DECODER CIRCUIT

BACKGROUND OF THE INVENTION

This invention relates to a decoder circuit and, more particularly, to an improved decoder circuit composed of MOS transistor devices.

Considerable effort has been directed recently at decreasing the size of metal-oxide-semiconductor (MOS) transistor circuits built in integrated form. One significant result of this effort has been the achievement of very small single chip integrated memory systems. A typical such system includes a matrix array of MOS storage devices combined with conventional peripheral circuitry including horizontal and vertical decoder circuits. By means of this circuitry the matrix array may be selectively addressed to place information in the memory and to abstract information therefrom.

For reasons of economy and speed of operation, it is desired that the overall size of the decoder circuits associated with an integrated MOS array of storage devices be minimized. As a practical matter, it is desired that the lateral extent of the integrated decoder circuits associated with each row and column of the storage array be comparable with the row-to-row and column-to-column dimensions of the array.

As the row-to-row and column-to-column dimensions of an MOS array of storage devices is decreased, a point is reached at which the physical size (area) of the associated conventional decoder circuits is found to be insufficiently small. Unless the circuits are reduced in size the advantages of constructing very-small-size arrays of MOS storage devices are to some extent negated.

Moreover, the problem of minimizing power consumption and consequent heating of integrated MOS systems becomes increasingly acute as the size of such systems is successively reduced. Accordingly, any success in reducing the power consumed by any of the constituent circuits of a very-small-size system makes it more likely that the overall system will function within prescribed power consumption and temperature limits.

SUMMARY OF THE INVENTION

Accordingly, an object of the present invention is an improved MOS decoder circuit.

More specifically, an object of this invention is a very-small-size MOS decoder circuit characterized by relatively low power consumption.

Briefly, these and other objects of the present invention are realized in a specific illustrative binary-to-one-out-of-N decoder circuit that includes only $4 + (x-1)$ MOS devices per pair of output lines of the circuit, where $2^x = N$.

The illustrative output lines of the illustrative decoder circuit are paired. One or more MOS transistor devices, each connected to receive a specified one of the input signals applied to the decoder, are connected between the lines of each pair. Also, four other MOS devices, arranged to receive additional input signals, are symmetrically connected to the lines of each different pair. Application to the circuit of multidigit binary input signals causes one and only one of the output lines to assume a distinct voltage state.

BRIEF DESCRIPTION OF THE DRAWING

A complete understanding of the present invention and of the above and other objects thereof will be gained from a consideration of the following detailed description of a specific illustrative embodiment thereof presented hereinbelow in connection with the accompanying drawing in which:

FIG. 2 is a schematic representation of the FIG. 1 circuit constructed in integrated circuit form;

FIG. 3 depicts a specific illustrative decoder circuit made in accordance with the principles of the present invention;

FIG. 4 schematically shows an integrated circuit version of the FIG. 3 circuit;

FIG. 5 represents the input signals applied to the FIG. 3 circuit; and

FIG. 6 is a truth table that specifies the logical operation of the FIG. 3 circuit.

DETAILED DESCRIPTION

Figure 1:
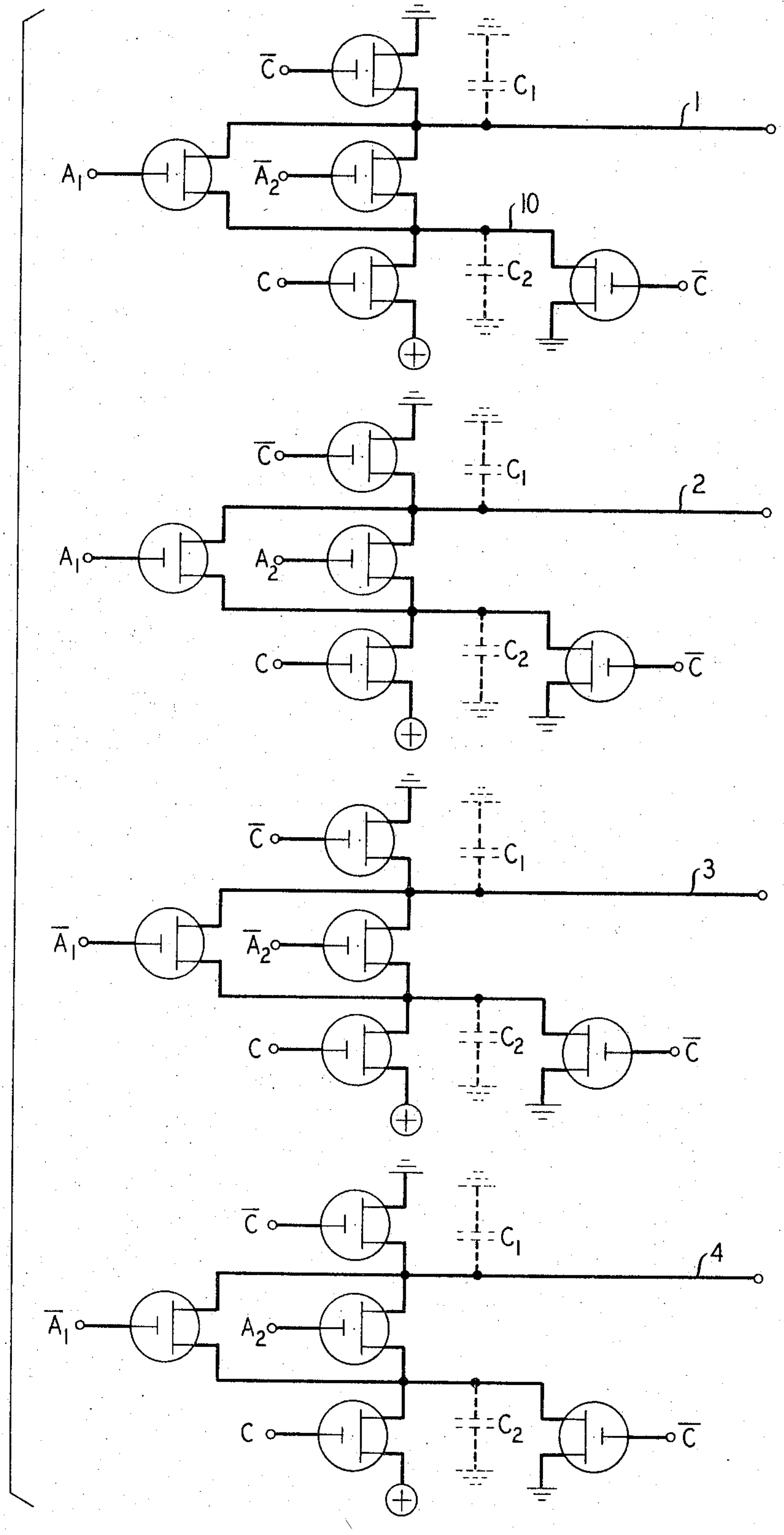
FIG. 1 PRIOR ART
FIG. 1 shows a prior art MOS binary-to-one-out-of-N decoder circuit.

Binary-to-one-out-of-N decoder circuits are utilized in the information processing art to perform translations in a variety of equipments and applications. One particularly important application for such circuits is in the horizontal and vertical addressing units of a dynamic memory system. An exemplary such system, fabricated entirely on a single monolithic integrated circuit chip, is described in application, Ser. No. 312,182, filed Dec. 4, 1972, now U.S. Pat. No. 3,771,147, issued Nov. 6, 1973. For illustrative purposes herein it will be assumed that the new decoder circuit to be described later below is fabricated in accordance with the IGFET (or MOS) techniques set forth in detail in the specified copending application. Moreover, it will be assumed that the new circuit is intended illustratively to be included on a single chip in combination with the memory devices themselves and their other associated peripheral circuitry, as described in the copending application.

For purposes of a specific example, it will be assumed that the MOS transistor devices described herein are of the p-channel type. But, of course, n-channel devices may also be utilized. In the latter case the polarities of the indicated input signals and voltage sources are respectively reversed, as is well known in the art.

A prior art binary-to-one-out-of-N MOS decoder circuit is shown in FIG. 1. For purposes of clarity and so as not to unduly complicate the drawing, FIG. 1 shows only a simple binary-to-one-out-of-four decoder circuit. This circuit could constitute, for example, a portion of the horizontal addressing unit of the aforementioned memory system. By employing another such decoder circuit in the vertical addressing unit, it is apparent that any specified one of 16 memory units in a matrix array of rows and columns may be uniquely addressed by coincident activation of the two decoder circuits.

In response to each different one of a set of binary signals applied to input terminals $A_1$, $\overline{A_1}$, $A_2$, $\overline{A_2}$, C and $\overline{C}$ of FIG. 1, the depicted circuit is effective to maintain one and only one of output lines 1 through 4 in its selected or so-called LOW state. Each of the other three lines is established in its HIGH state. (Herein LOW and HIGH will be assumed to refer to levels of about 3 and 16 volts, respectively.) A LOW or selected line primes all the memory devices connected to that line. Hence, if, for example, the selected line emanates from the horizontal addressing unit of the memory system, all the memory devices in a particular row of the memory array are primed. Simultaneous activation of the vertical addressing unit will select one of these primed devices.

Inspection of the prior art binary-to-one-out-of-four decoder circuit of FIG. 1 reveals that the depicted configuration includes five MOS transistor devices per output line. Each set of five devices constitutes a sub-unit of the decoder circuit and includes two main horizontally extending leads. Thus, for example, in the topmost sub-unit of FIG. 1 one of these leads is the output line 1 whereas the other such lead is an internal one designated 10. As seen, the sub-units are identical to each other.

The particular prior art decoder circuit shown in FIG. 1 requires a total of 20 MOS devices. More generally, prior art binary-to-one-out-of-N decoder circuits of the type shown in FIG. 1 require $3+x$ MOS devices per output line, where $2^x = N$.

The prior art circuit of FIG. 1 is inherently characterized by parasitic capacitances. These capacitances may be considered to exist mainly between ground and the particular horizontally extending leads shown in FIG. 1 (for example, the leads 1 and 10 in the aforementioned topmost sub-unit). These capacitances are represented in dashed outline and designated $C_1$ and $C_2$ in FIG. 1. As a practical matter, $C_1$ and $C_2$ are approximately comparable in magnitude to each other. Assuming that the voltage change with respect to ground that is established on the lines 1 and 10 of FIG. 1 during a decoding operation is V, the power consumed by the prior art decoding circuit is a function of $C_1V^2 + C_2V^2$ per output line.

FIG. 2 is a schematic representation that summarizes some of the aforementioned characteristics of the prior art decoder circuit of FIG. 1. Chip 22 is assumed to contain the entire MOS circuit shown in FIG. 1. (In a practical memory system, however, the decoder circuits would not be formed on a separate chip but would, as mentioned above, advantageously be formed on a single chip on which are placed the other constituent elements of the overall system. Nevertheless, for summary purposes and comparison, FIG. 2 is a convenient schematic depiction of FIG. 1.) The circuit represented in FIG. 2 requires 8 inputs (including a ground connection and a positive voltage supply lead) and has 4 output leads designated 1 through 4. As specified earlier above and as indicated in FIG. 2, this prior art decoder circuit requires 20 MOS devices.

In accordance with the principles of the present invention, the circuit of FIG. 1 is modified. One specific illustrative modification thereof is shown in FIG. 3 which comprises an MOS binary-to-one-out-four decoder circuit. As in FIGS. 1 and 2, the output lines of the FIG. 3 arrangement are also designated 1 through 4.

Significantly, the particular depicted FIG. 3 circuit includes only 5 MOS transistor devices per pair of output lines. Thus, the 4 output lines illustrated in FIG. 3 require a total of only 10 MOS devices, with suitable interconnections as shown, to form a complete binary-to-one-out-of-four decoder circuit. To fabricate the FIG. 3 arrangement in integrated circuit form requires approximately only half the area required by the FIG. 1 circuit.

FIG. 4, a schematic representation of the FIG. 3 circuit, is a convenient summary of some of the characteristics of FIG. 3. In one specific illustrative case, the value with respect to ground of the voltage applied to chip 42 of FIG. 4 by voltage supply lead 44 is 16 volts d.c.

The only major horizontally extending lines in FIG. 3 are the output lines themselves. As in the FIG. 1 arrangement, each of the lines of FIG. 3 also has a parasitic capacitance associated therewith. The capacitance of output line 1 is shown in dashed outline and designated $C_3$ in FIG. 3.

Assuming that the voltage change with respect to ground that is established on each of the output lines 1 through 4 during a decoding operation is $V$, the power consumed by the decoding circuit of FIG. 3 is a function of $C_3V^2$ per output line. Assuming that $C_3$ is comparable in magnitude to $C_1$ (FIG. 1), it is apparent that the power consumed by the FIG. 3 circuit is approximately only half as much per output line as that of FIG. 1.

The mode of operation of the FIG. 3 circuit is best understood with the aid of FIGS. 5 and 6. At time $T_0$ it is assumed that the potentials represented in FIG. 5 are applied to the input terminals $\overline{C}$, $A_1$, $A_2$, $\overline{A_1}$ and $\overline{A_2}$ of FIG. 3. At $T_0$ only MOS devices 30 through 33, each of which includes conventional gate, source and drain electrodes, have relatively LOW potentials applied to their respective gate electrodes. Hence, only these devices of those shown in FIG. 3 are enabled or maintained in their ON (conductive) states. All the other depicted MOS devices are not enabled. In other words, they are maintained in their OFF (high impedance) conditions. As a result, all four output lines 1 through 4 are tied to a potential near ground. Accordingly, all 4 output lines are said to be in their LOW states at $T_0$. In this quiescent condition no power is being consumed by the depicted decoder circuit.

At time $T_1$ shown in FIG. 5, a so-called selection cycle is initiated. At the start of such a cycle the $\overline{C}$ or clock signal is always controlled by external timing circuitry (not shown) to make the transition toward its relatively HIGH voltage state. On the other hand, $A_1$ and $A_2$ and their respective complements $\overline{A_1}$ and $\overline{A_2}$ are each either maintained in their relatively HIGH voltage states or switched toward their relatively LOW voltage conditions, depending on which one of the output lines is to be selected during the selection cycle. As mentioned earlier above, a particular output line will be considered to have been selected if it is maintained in its LOW state. All nonselected lines are driven to their relatively HIGH voltage conditions.

To illustrate the selection capabilities of the FIG. 3 circuit, assume, for example, that it is desired to select only output line 3 thereof. The voltage levels required to be applied to the circuit during the so-called selection cycle to accomplish that result are specified in the second-from-the-right column of the truth table of FIG. 6. As specified there, all of the $A_1$ and $A_2$ input terminals are driven toward their LOW states. This is graphically indicated by the solid line in the second row of FIG. 5. Correspondingly, $\overline{A_1}$ and $\overline{A_2}$ are maintained in their HIGH states, as indicated by the truth table of FIG. 6 and the solid line in the third row of FIG. 5. As mentioned earlier, $\overline{C}$ is concurrently switched to its HIGH condition.

As a result of the voltage conditions specified in the paragraph immediately above, only MOS devices 35 through 37 of those shown in FIG. 3 are enabled during the selection cycle which commences at $T_1$. Due to the enablement of devices 35 and 36, output lines 1 and 2 are in effect clamped at a voltage level approximating the value of the source 38 connected to the device 36. Hence, lines 1 and 2 are switched to their HIGH states. Similarly, line 4 is connected via the enabled device 37 to source 39. Hence, line 4 is also switched to its HIGH state. Only line 3 is not so switched. The potential thereon, therefore, tends to remain at the LOW level applied thereto prior to $T_1$. Accordingly, during the selection cycle line 3 and only line 3 remains in its LOW or selected state. As indicated, the other lines are switched to their HIGH or unselected conditions.

In accordance with the precise conditions specified by the truth table of FIG. 6 and by reference to the voltage level diagrams of FIG. 5, it is a straightforward and apparent matter to verify the remaining selection capabilities of the FIG. 3 circuit. Thus, for example, to select output line 1, only MOS devices 36, 37 and 40 are enabled. To select output line 2, only devices 40 through 42 are enabled, and to select line 4 only devices 35, 41 and 42 are enabled.

Although a specific one-out-of-four decoding embodiment has been emphasized herein, it is to be understood that the principles of the present invention are applicable to one-out-of-N decoder circuits. Thus, for example, a one-out-of-eight decoder circuit made in accordance with this invention would include an additional MOS device connected across each pair of output lines. More specifically, an additional MOS device would be connected in parallel with the device 35 of FIG. 3 and another such device would be connected in parallel with the device 40. Moreover, two additional sub-units each identical in configuration to the modified ones just described would be added to the FIG. 3 circuit. Each of these additional sub-units would also have two output lines emanating therefrom.

In general, a one-out-of-N decoder circuit made in accordance with this invention includes N/2 sub-units each having a pair of output lines. Additionally, the total number of MOS devices connected in parallel across each pair of N output lines is $x - 1$, where $2^x = N$. But regardless of the value of $N$, only 4 additional MOS devices (comparable, for example, to the devices 30, 31, 36 and 41 in the topmost sub-unit of FIG. 3) are respectively connected to each pair of output lines in each sub-unit. Thus, the total number of MOS devices in a one-out-of-N decoder made in accordance with this invention is specified by the expression $[4 + (x - 1)]N/2$.

The aforementioned 4 MOS devices connected to each pair of output lines may be regarded as being connected thereto in a symmetrical fashion. Thus, each line of the pair is connected to two of the four devices. Moreover, the set of 2 devices connected to one line of the pair is an exact replica of the set of 2 devices connected to the other line of the pair.

It is to be understood that the above described arrangements are only illustrative of the application of the principles of the present invention. In accordance with these principles, numerous other arrangements may be devised by those skilled in the art without departing from the spirit and scope of the invention.

What is claimed is:

1. In combination, at least two pairs of output terminals, a plurality of input terminals to which binary input signals and reference potential levels are to be supplied, at least one MOS device associated with each pair of output terminals and having its source and drain electrodes respectively connected thereto, a pair of MOS devices associated with each terminal of each pair of output terminals, each device of each such pair of devices having one of its source and drain electrodes connected to its associated terminal and the other one of its source and drain electrodes connected to one of said input terminals to which reference potential levels are to be supplied, and means connecting the gate electrodes of all of said devices to said input terminals to which binary input signals are to be supplied.

2. A combination as in claim 1 further including means connected to said input terminals for applying thereto binary input signals and reference potential levels.

3. In combination, at least first and second pairs of output terminals, at least one MOS transistor device associated with each pair of output terminals, means respectively connecting the source and drain electrodes of each MOS transistor device to its associated pair of output terminals, four additional MOS transistor devices associated with each pair of output terminals, means connecting one of the source and drain electrodes of each of two of said four MOS transistor devices to one of the associated pair of output terminals and connecting one of the source and drain electrodes of each of the other two MOS transistor devices to the other one of the associated pair of output terminals, a plurality of input terminals, and means respectively connecting said input terminals to the gate electrodes of said MOS devices and to the other one of the source and drain electrodes of each of said four additional MOS devices connected to each pair of output terminals.

4. A binary-to-one-out-of-N decoder circuit comprising $N/2$ sub-units each having two output lines emanating therefrom, where $N = 2^n$, $n$ being any positive integer greater than one, $x - 1$ switching devices included in each of said sub-units and connected in parallel between the output lines emanating therefrom, where $2^x = N$, four additional switching devices included in each of said sub-units and connected to the output lines emanating therefrom, two of the additional devices in each sub-unit each having one of its source and drain electrodes connected to one of the output lines emanating from the sub-unit and the other two of the additional devices in each sub-unit each having one of its source and drain electrodes connected to the other one of the output lines emanating from the sub-unit, and means for applying input signals to the respective devices included in said sub-units to establish one and only one of said output lines in a unique voltage condition.

5. A circuit as in claim 4 wherein each of said switching devices comprises an MOS transistor.

6. A binary-to-one-out-of-N decoder adapted to be fabricated on a single chip in integrated circuit form, where $N = 2^n$, $n$ being any positive integer greater than one, said decoder comprising $N/2$ pairs of output terminals, at least one MOS transistor device having its source and drain electrodes respectively connected between each pair of output terminals, a set of four additional MOS transistor devices associated with each pair of output terminals, two of the additional devices in a set each having one of its source and drain electrodes connected to one terminal of the associated pair of output terminals and the other two of the additional devices in a set each having one of its source and drain electrodes connected to the other terminal of the associated pair of output terminals, and a plurality of input terminals connected to the gate electrodes of all said devices and to the other ones of the source and drain electrodes of each device of said sets of devices.

* * * * *